United States Patent
Choi et al.

(10) Patent No.: US 9,876,832 B2
(45) Date of Patent: Jan. 23, 2018

(54) SOUND SIGNAL-BASED LOCAL INTERACTIVE PLATFORM SYSTEM AND LOCAL INTERACTIVE SERVICE PROVIDING METHOD USING SAME

(71) Applicant: IPOPCORN CO., LTD, Seoul (KR)

(72) Inventors: Jae-Joon Choi, Seoul (KR); Kyung-Hoon Kim, Gyeonggi-do (KR); Ju-No Yoon, Seoul (KR); Hyun-Min Lee, Gyeonggi-do (KR)

(73) Assignee: IPOPCORN CO., LTD, Seoul (KR)

( * ) Notice: Subject to any disclaimer, the term of this patent is extended or adjusted under 35 U.S.C. 154(b) by 210 days.

(21) Appl. No.: 14/759,754

(22) PCT Filed: Sep. 5, 2013

(86) PCT No.: PCT/KR2013/008041
§ 371 (c)(1),
(2) Date: Jul. 8, 2015

(87) PCT Pub. No.: WO2014/137046
PCT Pub. Date: Sep. 12, 2014

(65) Prior Publication Data
US 2015/0365455 A1    Dec. 17, 2015

(30) Foreign Application Priority Data
Mar. 8, 2013  (KR) .................. 10-2013-0025228

(51) Int. Cl.
*H04L 29/06*    (2006.01)
*H04L 29/08*    (2006.01)
(Continued)

(52) U.S. Cl.
CPC .............. *H04L 65/60* (2013.01); *G06F 3/165* (2013.01); *H04L 67/32* (2013.01); *H04W 4/02* (2013.01)

(58) Field of Classification Search
CPC .......... H04L 65/60; H04L 67/32; H04W 4/02; G06F 3/165
See application file for complete search history.

(56) References Cited

U.S. PATENT DOCUMENTS

| 9,026,036 B2* | 5/2015 | Saban ................. H04W 88/085 455/10 |
| 2006/0095199 A1* | 5/2006 | Lagassey ............... G07C 5/008 701/117 |

(Continued)

FOREIGN PATENT DOCUMENTS

| JP | 2008099197 | 4/2008 |
| KR | 20020024081 | 3/2002 |

(Continued)

OTHER PUBLICATIONS

"Full Duplex Wireless"—Levis et al, Stanford Univ., Oct. 2012 http://csl.stanford.edu/~pal/talks/duplex-princeton.pdf.*

*Primary Examiner* — Randy Scott
(74) *Attorney, Agent, or Firm* — Dilworth & Barrese, LLP.; Michael J. Musella, Esq.

(57) ABSTRACT

The present invention relates to a technology for providing a place/time-based local interactive service, which provides multi-formatted content information to a user moving while carrying a smart terminal having a dedicated application installed therein. In particular, when moving into a place were a specific wired/wireless AP is installed, a user who carries a smart terminal with a dedicated application activated therein can receive multi-formatted content information previously mapped with the place using a place/time, without a separate manipulation of the smart terminal. According to the present invention, time periods during which the user carrying the smart terminal stays at the place where the specific wired/wireless AP is installed are accu- (Continued)

(a)

(b)

mulated and managed using time coins, and the user is then given a benefit according to the accumulated time periods.

5 Claims, 6 Drawing Sheets

(51) Int. Cl.
*H04W 4/02* (2009.01)
*G06F 3/16* (2006.01)

(56) References Cited

U.S. PATENT DOCUMENTS

2007/0103824 A1* 5/2007 Patterson ................ H02G 3/00
                                                              361/54
2013/0150028 A1* 6/2013 Akins .................... H04W 4/02
                                                             455/427

FOREIGN PATENT DOCUMENTS

| KR | 1020070034566 | 3/2007 |
| KR | 1020100025415 | 3/2010 |
| KR | 1020110050256 | 5/2011 |

* cited by examiner

[Fig. 1]
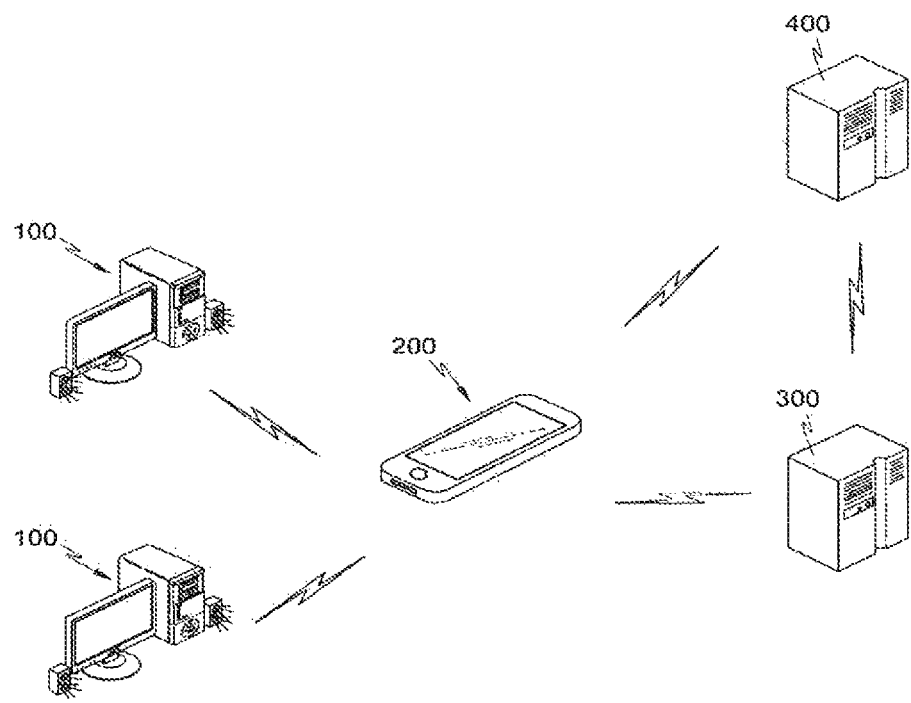

[Fig. 2]
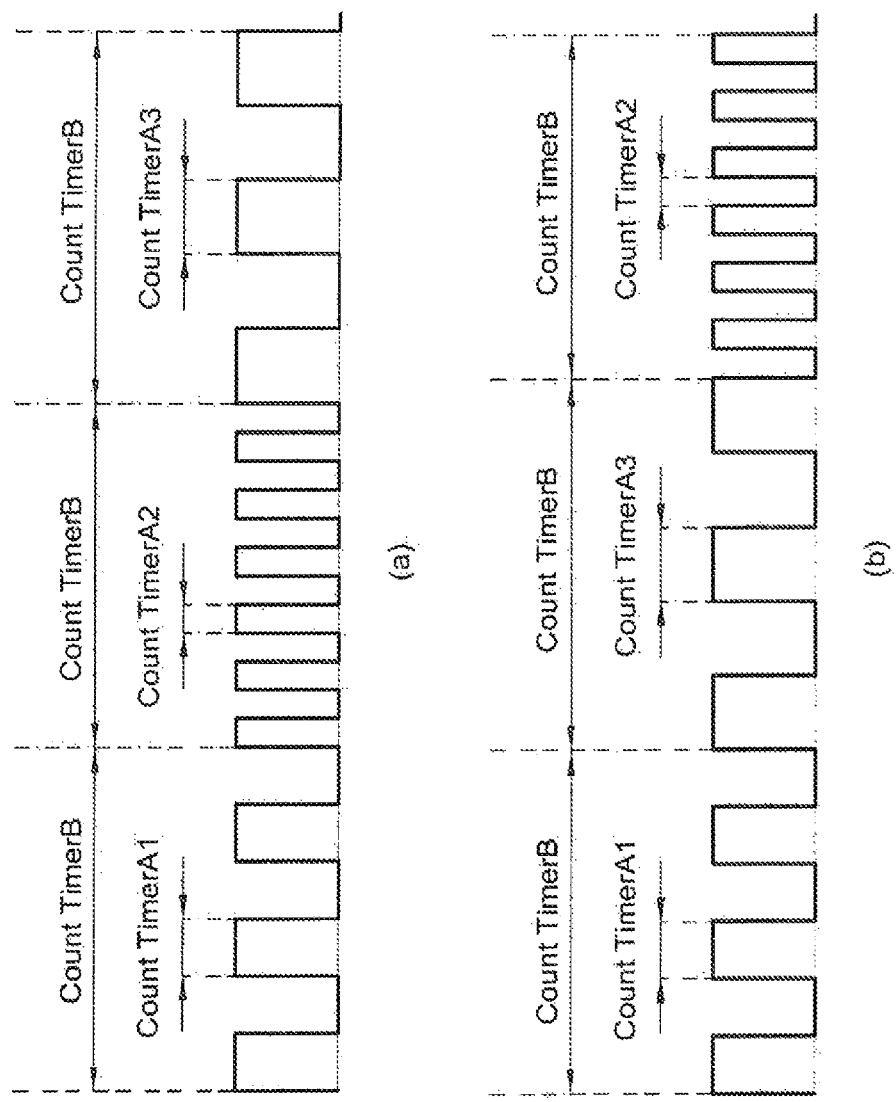

[Fig. 3]
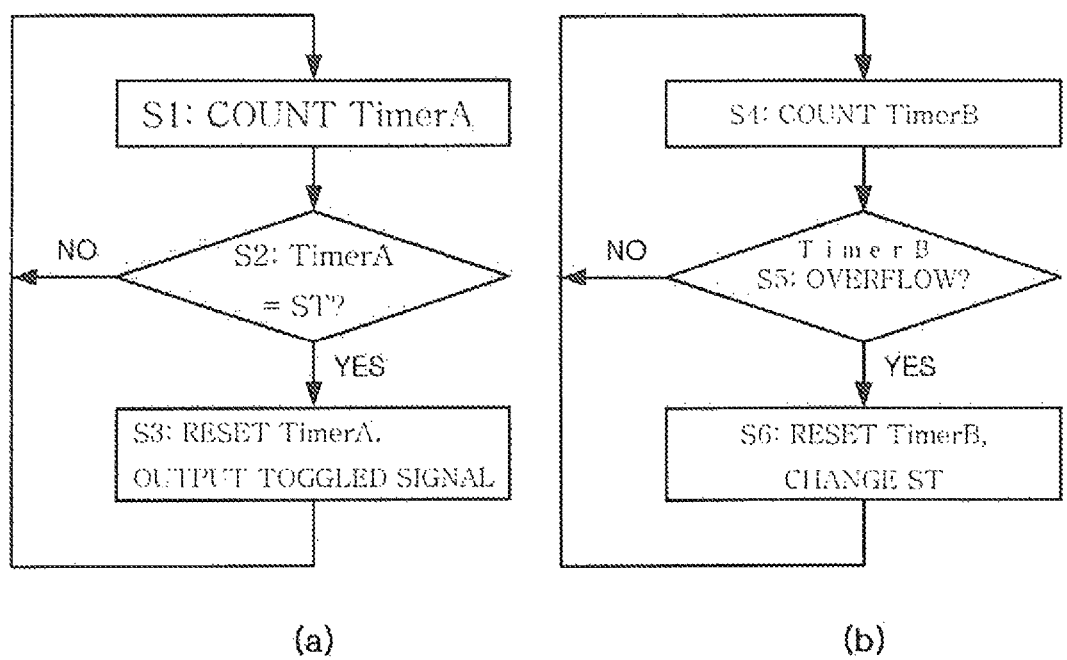
(a)  (b)

[Fig. 4]
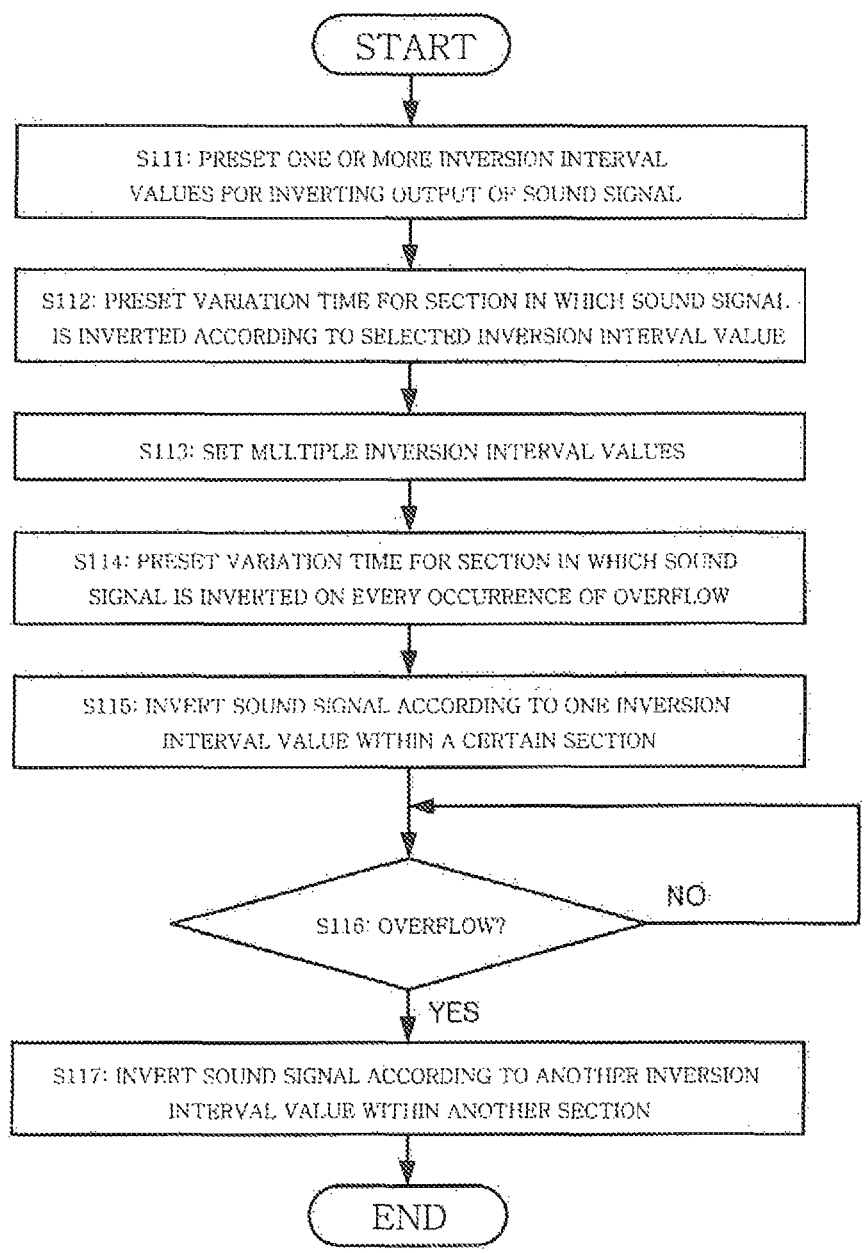

[Fig. 5]
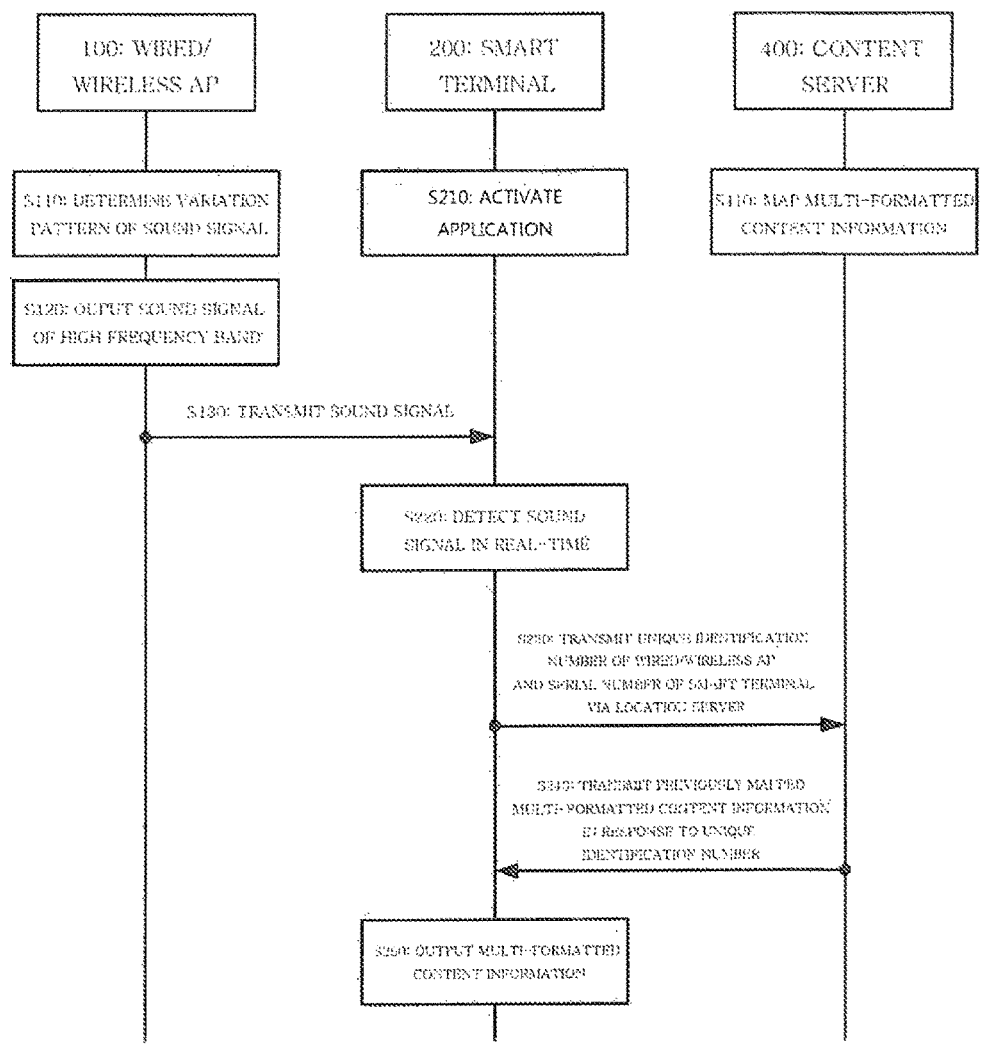

[Fig. 6]
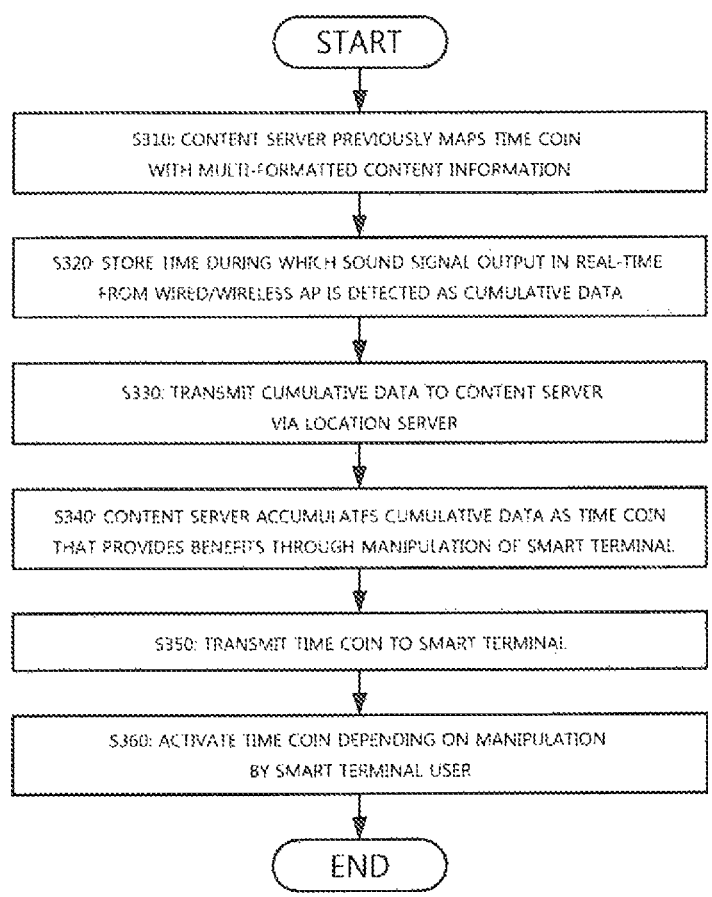

SOUND SIGNAL-BASED LOCAL INTERACTIVE PLATFORM SYSTEM AND LOCAL INTERACTIVE SERVICE PROVIDING METHOD USING SAME

TECHNICAL FIELD

The present invention generally relates to a technology for providing a place/time-based local interactive service that provides multi-formatted content information to a user moving while carrying a smart terminal in which a dedicated application is installed.

More particularly, the present invention sets a sound signal, which is output from a wired/wireless AP installed in various locations, as an individual pattern. When a user carrying a smart terminal enters an area in which the sound signal is output, the smart terminal detects the sound signal that has a unique number for a position of the corresponding wired/wireless AP. This information detected by the smart terminal is transmitted to a content server, and based on the received information, the content server transmits multi-formatted content information, which is previously mapped with the sound signal of the corresponding wired/wireless AP, to the smart terminal, which outputs the content information.

Also, the present invention relates to a technology in which a content server accumulates the time, during which a user carrying the smart terminal stays in the range of the sound signal output from the wired/wireless AP, as a time coin to be managed, and the user of the corresponding smart terminal is provided with certain benefits according to the accumulated time coin.

BACKGROUND ART

Generally, an interactive service refers to a service form capable of bidirectional data transmission departing from existing unidirectional data transmission.

Especially, depending on various applications installed in mobile devices and smart terminals, various interactive services related to an application can be used.

However, in the case of an interactive service using an application installed in existing smart terminals and the like, a user may use a corresponding service by manipulating a relevant menu in a smart terminal in which a dedicated application is installed.

In other words, though such an application is installed in smart terminals and the like, only a user adept in manipulation of the application may properly use a service corresponding to the application.

DOCUMENTS OF RELATED ART

1. Method for providing advertisement on interactive service (Korean Patent application Publication No. 10-2008-0084137)
2. System for processing coupon or authentication code using sound data (Korean Patent Application Publication No. 10-2007-0024716)

DISCLOSURE

Technical Problem

An object of the present invention is to provide a technology based on a place/time method in which when a user carrying a smart terminal, in which a dedicated application is activated, enters a certain place, multi-formatted content information corresponding to a specific pattern of a sound signal may be output in the smart terminal without special manipulation thereof by detecting the specific pattern of sound signal from a wired/wireless AP installed in the corresponding place.

Technical Solution

In order to accomplish the above object, a sound signal-based local interactive platform system according to the present invention is configured to include: a wired/wireless AP 100 that has unique identification information for a location and that outputs a sound signal of a high frequency band in a preset variation pattern; a computer-readable recording medium, which is mounted in a smart terminal having a serial number, and which stores therein a program that when in an activated state, detects in real-time the serial number and the sound signal and transmits the unique identification information corresponding to the sound signal and the serial number to outside; a location server 300 that receives the serial number and the sound signal from the smart terminal, and that transmits the serial number and the unique identification information corresponding to the sound signal to the outside; and a content server 400 that receives the serial number and the unique identification information from the location server, and that transmits in real-time multi formatted content information including audio data and video data, which is previously mapped with the unique identification information, to the smart terminal to be output.

In this case, in the wired/wireless AP, one or more inversion interval values for inverting an output of the sound signal are preset, a variation time for a section in which the sound signal is inverted according to an inversion interval value selected from among the one or more inversion interval values is preset, and when two or more inversion interval values are preset, the variation pattern is preset by inverting the output of the sound signal sequentially depending on the two or more inversion interval values on every occurrence of overflow exceeding the variation time.

The smart terminal automatically outputs in real-time the multi-formatted content information received from the content server.

The smart terminal stores time, during which the sound signal output in real-time from the wired/wireless AP is detected, as cumulative data, and then transmits the cumulative data to the content server via the location server, and the content server accumulates the received cumulative data as a time coin that a user may use through manipulation of the smart terminal, and maps the time coin with the multi-formatted content information.

Also, a sound signal-based local interactive service providing method according to the present invention is configured to include: (a) presetting a variation pattern for a sound signal that is output from a wired/wireless AP having unique identification information for a location to the outside; (b) previously mapping multi-formatted content information, which includes audio data and video data, with the variation pattern in a content server; (c) outputting a sound signal according to the preset variation pattern from the wired/wireless AP to the outside; (d) detecting, by a smart terminal having a serial number, in real-time the sound signal output from the wired/wireless AP; (e) by a location server, receiving the serial number and the detected sound signal from the smart terminal, and transmitting the serial number and the unique identification information corresponding to the sound signal to the content server; and (f) by the content server, receiving the serial number and the unique identification information from the location server, and transmitting the multi-formatted content information corresponding to the unique identification information to the smart terminal to be output.

In the present invention, step (a) includes: (a-1) presetting one or more inversion interval values for inverting an output of the sound signal; (a-2) presetting a variation time for a section in which the sound signal is inverted according to an inversion interval value selected from among the one or more inversion interval values; and (a-3) when two or more of the inversion interval values are preset, presetting the variation pattern by inverting the output of the sound signal sequentially depending on the two or more of the inversion interval values on every occurrence of overflow exceeding the variation time.

Step (d) further includes: (d-1) storing, by the smart terminal, time during which the sound signal output in real-time from the wired/wireless AP is detected as cumulative data; and (d-2) transmitting the stored cumulative data to the content server via the location server, step (f) further includes accumulating, by the content server, the cumulative data received via the location server as a time coin that may provide a benefit through manipulation of the smart terminal, and step (b) further includes previously mapping the time coin with the multi-formatted content information.

On the other hand, a computer-readable recording medium according to the present invention records therein a program for implementing the sound signal-based local interactive service providing method.

Advantageous Effects

According to the present invention, the following effects may be achieved.

(1) When a user carrying a smart terminal in which a dedicated application is installed enters a certain place, by detecting a specific pattern of sound signal output from a wired/wireless AP installed in the place, multi-formatted content information corresponding to the specific pattern of sound signal may be output in the smart terminal without special manipulation by a user.

(2) By specifying a pattern of a sound signal output from a wired/wireless AP installed in various places, a content server may transmit multi-formatted content information previously mapped with a corresponding sound signal to a smart terminal, which has detected the corresponding sound signal, by an Auto-sync method. Therefore, in contrast with an existing method of indiscriminate delivery of information, a new pattern of local interactive service may be provided.

(3) A wired/wireless AP having unique identification information for a certain location (place) is set to output specific pattern of sound signal, and when a smart terminal enters into the output range of the sound signal of the corresponding wired/wireless AP, a content server may transmit multi-formatted content information previously mapped with the sound signal of the wired/wireless AP to the smart terminal to output the multi-formatted content information. Therefore, information customized to a place. Where a user carrying the smart terminal may visit may be provided.

(4) Time during which a user carrying a smart terminal stays in a place in which a certain wired/wireless AP is installed is accumulated as a time coin, and benefits according to the time coin may be provided. After consultation between a content server provider and an individual business person managing, for example, a movie theater, a café/a coffee shop, a bank/public service, an exhibition/museum, a wedding exhibition, a digital signage, a franchise/shop, a department store/outlet, a restaurant/cafeteria, etc., multi-formatted content information adapted to a purpose may be previously tapped with the wired/wireless AP installed in the corresponding place.

DESCRIPTION OF DRAWINGS

FIG. 1 is a block diagram in which the whole of a sound signal-based local interactive platform system according to the present invention is simply illustrated;

FIG. 2 is a graph illustrating examples in which a variation pattern of a sound signal of the present invention is set;

FIG. 3 shows a flow diagram illustrating a process for setting an inversion interval value and a variation time for a certain section in which a constant inversion interval value is maintained, according to the present invention;

FIG. 4 is a flow diagram illustrating an example for setting a variation pattern of a sound signal of the present invention;

FIG. 5 is a flow diagram illustrating a process for providing a sound signal-based local interactive service according to the present invention; and FIG. 6 is a flow diagram illustrating a process for providing a time coin according to the present invention.

BEST MODE

Hereinafter, the present invention is described in detail referring to the drawings.

FIG. 1 is a block diagram in which the whole of a sound signal-based local interactive platform system according to the present invention is simply illustrated. Referring to FIG. 1, the sound signal-based local interactive platform system according to the present invention is configured to include a wired/wireless AP 100, a smart terminal 200, location server 300, and a content server 400.

The wired/wireless AP 100 has unique identification information for a location, and outputs a sound signal of a high frequency band in a preset variation pattern to the outside. The wired/wireless AP 100 may output the sound signal by generating sound waves via a speaker of a PC that communicates through the Internet.

The smart terminal 200 has a serial number, and records a program (a dedicated application) that detects in real-time the serial number and a sound signal while the program installed in a recording medium is activated, and that transmits both unique identification information corresponding to the sound signal and the serial number to an external location server 300.

Also, the smart terminal 200 outputs in real-time on, for example, a display, multi-formatted content information, received from the content server 400. In this case, without special manipulation by a user of the smart terminal 200 in which the dedicated application is installed, previously mapped multi-formatted content information may be output automatically (Auto-Sync method) while the dedicated application is activated in the smart terminal 200.

Also, the smart terminal 200 stores the time during which a sound signal output in real-time from the wire/wireless AP is detected as cumulative data and transmits the data to the content server 400 via the location server 300. The content server 400 accumulates the received cumulative data as a time coin to be managed, which is used by user's manipulation of the smart terminal 200, and maps the time coin with multi-formatted content information. In this case, unlike multi-formatted content information that is automatically output in the smart terminal 200 without special manipulation, whether to use the time coin should be decided by the user. To use the time coin like cash, the user may operate a menu displayed in the smart terminal 200.

The location server 300 receives a serial number and a sound signal from the smart terminal 200, and transmits the serial number and unique identification information corresponding to the sound signal to the content server 400.

The content server 400 receives the serial number and the unique identification information from the location server 300, and transmits in real-time multi-formatted content information including audio data and video data, which is previously mapped with the unique identification information, to the smart terminal 200 to output the multi-formatted content information.

FIG. 2 is a graph illustrating examples in which a variation pattern for a sound signal of the present invention is set.

Referring to FIG. 2, the wired/wireless AP 100 presets one or more inversion interval values for inverting an output of a sound signal, and a variation time for a certain section in which the sound signal is inverted according to an inversion interval value selected from among the preset inversion interval values. When two or more inversion interval values are preset, a variation pattern is preset by inverting the output of a sound signal sequentially depending on the two or more of the inversion interval values on every occurrence of overflow exceeding the variation time.

In other words, to output a specific sound signal having various patterns, a variation pattern for inverting the output of a sound signal is preset in the wired/wireless AP 100. Specifically, (a) of FIG. 2 is an example of a preset inversion pattern. Here, as a variation time (TimerB) for one or more sections in which a signal is inverted, the same time period is set for the sections. Also, a variation pattern of a sound signal may be set to have a constant inversion interval value (TimeA1 or TimeA2 or TimeA3) within a single section.

(b) of FIG. 2 is an example of another fixed inversion pattern in which several sections having the same variation time (TimerB) are set as in (a) of FIG. 2 but the order of the inversion interval values (TimerA1 or TimerA3 or TimerA2) applied to each of the sections is changed. As a result, a different pattern of sound signal may be output in comparison with (a) of FIG. 2.

As in (a) and (b) of FIG. 2, a variation pattern for inverting a sound signal is set to have various patterns, and the content server 400 previously maps individual multi-formatted content information with a sound signal corresponding to each variation pattern.

In this case, a sound signal having a specific inversion pattern is output from a wired/wireless AP 100 installed in a certain place. When a smart terminal 200 passing through the place in which the corresponding wired/wireless AP 100 is installed detects the sound signal, multi-formatted content information previously mapped in the content server 400 is transmitted to the smart terminal 200 and is automatically output on the smart terminal 200, in response to the specific sound signal and unique identification information of the wired/wireless AP 100.

FIG. 3 shows a flow diagram illustrating a process for setting an inversion interval value and a variation time for a certain section in which a constant inversion interval value is maintained, according to the present invention. Referring to FIG. 3, in the wired/wireless AP 100 adopted by the present invention, a control unit and a time may be mounted.

The control unit controls signal inversion for a variation pattern of a sound signal output from the wired/wireless AP 100, and the timer checks a preset variation time (TimerB) and preset inversion interval values (TimerA1, TimerA2, and TimerA3) of FIG. 2 and informs the control unit of the data.

Specifically, referring to (a) of FIG. 3, while the timer counts preset inversion interval values (TimerA; TimerA1, TimerA2, and TimerA3 of FIG. 2) at step S1, when the inversion interval value is the same as a preset value (ST) at step S2, a sound signal is inverted as [1→0] or [0→1] at step S3. Then, while the inversion interval value (TimerA) is repeatedly counted again, the sound signal is output.

Referring to (b) of FIG. 3, the timer counts a preset variation time (TimerB) at step S4. On every occurrence of overflow exceeding the value of the preset variation time at step S5, the variation time is changed to another preset variation time (TimerB). In this case, the variation time (TimerB) may be maintained consistently. When the variation time (TimerB) is consistently maintained, through a variation pattern in which inversion interval values (TimerA) are differently set and the order of the inversion interval values is adjusted, a sound signal having various patterns may be output.

In other words, if a sound signal, which is output as a form of a certain number of patterns, is set for a single wired/wireless AP 100 installed in a location, unique identification information about the position of the wired/wireless AP 100 may be identified based on the detected sound signal.

FIG. 4 is a flow diagram illustrating an example in which a variation pattern for a sound signal of the present invention is set. Referring to FIG. 4, a process for previously setting a variation pattern of a sound signal, which is output from a wired/wireless AP 100 installed in a certain location, is described as follows.

At steps S111 and S112, first, one or more inversion interval values (TimerA1, TimerA2, and TimerA3 of FIG. 2) for inverting the output of a sound signal are preset. Then, a variation time (TimerB) for a certain section in which the sound signal is inverted according to an inversion interval value selected from among the inversion interval values is preset. In this case, the variation time (TimerB) may be consistently maintained for every section, or may be different for each section.

At steps S113 and S114, two or more inversion interval values that may be combined with each other are set in order that a wired/wireless AP 100 installed in a certain location and a wired/wireless AP 100 installed in another location have different variation patterns. Then, another variation time for a section in which the sound signal is inverted on every occurrence of overflow exceeding the first variation time is also preset. As described above, the variation time may be maintained for every section, and may be different for each section.

At steps S115, S116, and S117, when a sound signal is output, as the sound signal is inverted according to an inversion interval value within a section having a constant variation time, the sound signal has a specific variation pattern. Subsequently, if overflow exceeding the preset variation time occurs, the sound signal is inverted according to another preset inversion interval value within another section and as a result, a specific variation pattern is implemented.

FIG. 5 is a flow diagram illustrating a process for providing a sound signal-based local interactive service according to the present invention.

At steps S110 and S410, first, one or more inversion interval values for inverting the output of a sound signal are set in a wired/wireless AP 100. Then, a variation time for a section in which a sound signal is inverted according to an inversion interval value selected from among the inversion interval values is preset. In this case, if two or more inversion interval values are set, whenever overflow exceeding the variation time occurs, a specific variation pattern is established by setting the output of the sound signal to be inverted sequentially depending on the two or more inversion interval values.

Also, a content server 400 previously maps multi-formatted content information including audio data and video data with the corresponding variation pattern. In this case, after consultation between a content server provider and an individual business person managing, for example, a movie theater, a café/a coffee shop, a bank/public service, an exhibition/museum, a wedding exhibition, a digital signage, a franchise/shop, a department store/outlet, a restaurant/cafeteria, etc., the multi-formatted content information may be organized according to a purpose of the place in which a wired/wireless AP is installed.

At step S120, a sound signal of a high frequency band, which has a specific variation pattern, is output from the wired/wireless AP 100 installed in a certain location and is transmitted within a certain range by wireless local area network.

At steps S130 and S140, the output sound signal is detected by a smart terminal 200 of a user who stays near the wired/wireless AP 100 or who passes near the wired/wired AP 100. In this case, the smart terminal 200 maintains a state in which a dedicated application stored in a recording medium of the present invention is installed and activated at step S210.

Here, unlike an existing interactive service in which information is indiscriminately delivered to a smart terminal 200, based on a Real Time Location Service (RTLS), a user of the smart terminal 200 may suitably use information that a content server 400 wants to deliver through a wired/wireless AP 100 of a certain location.

At steps S220 and S230, a sound signal detected by the smart terminal 200 is transmitted to a content server 400 via a location server 300, through a network such as 3G, Wi-Fi, and the like. In this case, using the sound signal transmitted from the smart terminal 200 to the content server 400, the content server 400 may identify unique identification information of the corresponding wired/wireless AP 100 and a serial number of the smart terminal 200.

At steps S240 and S250, subsequently, the content server 400 transmits multi-formatted content information, which is previously mapped with the unique identification information of the wired/wireless AP 100, to the smart terminal 200 to be output, for example, on a display. In this case, in the smart terminal 200 in which a dedicated application is activated, the multi-formatted content information transmitted from the content server 400 is automatically output by an Auto-sync method, without user's special manipulation.

FIG. 6 is a flow diagram illustrating a process for providing a time coin according to the present invention. Referring to FIG. 6, in the present invention, a content server 400 accumulates the time, during which a user carrying a smart terminal 200 stays within the range of a sound signal output from a wired/wireless AP 100, as a time coin that can be used like cash, and manages the time coin. According to the accumulated time coin, certain benefits are provided to the user of the corresponding smart terminal 200. The precise process is described as follows.

At step S310, the content server 400 previously maps multi-formatted content information with a variation pattern of a sound signal of a wired/wireless AP 100. Here, the time coin is also previously mapped as a kind of the multi-formatted content information.

At steps S320 and S330, a dedicated application installed in a smart terminal 200 stores the time, during which a sound signal output in real-time from a wired/wireless AP 100 is detected by a smart terminal 200, as cumulative data. Then, the stored cumulative data is transmitted to the content server 400 via the location server 300.

At steps S340 and S350, subsequently, based on the received cumulative data, the content server 400 accumulates and manages a time coin from which a user carrying the smart terminal 200 benefits, and transmits the time coin that is accumulated and managed to the corresponding smart terminal 200. The transmitted time coin is automatically displayed in the smart terminal 200 by an Auto-Sync method.

At step S360, whether to use the time coin, which is automatically displayed in the smart terminal 200, is determined and the time coin may be activated by user's additional manipulation. Here, there are various services using a time coin as cash, for example, subscribing to a periodical, obtaining a shopping coupon, and the like.

The present invention may be implemented in a form of a computer-readable code in a computer-readable recording medium. In this case, the computer-readable recording medium includes all types of recording media in which data that can be read by a computer system is stored.

Examples of the computer-readable recording medium include the following: ROM, RAM, CD-ROM, magnetic tapes, floppy disks, optical data storage, and the like. Also, the computer-readable recording medium may be implemented in a form of carrier waves (for example, transmission through Internet). Also, this recording medium may be distributed in a computer system connected by a network, and codes that computers can read may be stored and executed using a distributed method. Also, functional programs, codes, code segments to implement the present invention can be easily inferred by programmers in the art of the present invention.

The invention claimed is:

1. A sound signal-based local interactive platform system, comprising:
   a wired/wireless AP (100) that has unique identification information for a location and that outputs a sound signal of a high frequency band in a preset variation pattern;
   a computer-readable recording medium, which is mounted in a smart terminal having a serial number, and which stores therein a program that when in an activated state, detects in real-time the serial number and the sound signal and transmits the unique identification information corresponding to the sound signal and the serial number to outside;
   a location server (300) that receives the serial number and the sound signal from the smart terminal, and that transmits the serial number and the unique identification information corresponding to the sound signal to the outside; and
   a content server (400) that receives the serial number and the unique identification information from the location server, and that transmits in real-time multi-formatted content information including audio data and video data, which is previously mapped with the unique identification information, to the smart terminal to be output, wherein in the wired/wireless AP, one or more inversion interval values for inverting an output of the sound signal are preset, a variation time for a section in which the sound signal is inverted according to an inversion interval value selected from among the one or more inversion interval values is preset, and when two or more inversion interval values are preset, the variation pattern is preset by inverting the output of the sound signal sequentially depending on the two or more inversion interval values on every occurrence of overflow exceeding the variation time.

2. The sound signal-based local interactive platform system of claim 1, wherein the smart terminal automatically outputs in real-time the multi-formatted content information received from the content server.

3. The sound signal-based local interactive platform system of claim 2, wherein the smart terminal stores time, during which the sound signal output in real-time from the wired/wireless AP is detected, as cumulative data, and then transmits the cumulative data to the content server via the location server, and the content server accumulates the received cumulative data as a time coin that a user may use through manipulation of the smart terminal, and maps the time coin with the multi-formatted content information.

4. A sound signal-based local interactive service providing method, comprising:
(a) presetting a variation pattern for a sound signal that is output from a wired/wireless AP having unique identification information for a location to the outside, comprising the steps of:
   (a-1) presetting one or more inversion interval values for inverting an output of the sound signal,
   (a-2) presetting a variation time for a section in which the sound signal is inverted according to an inversion interval value selected from among the one or more inversion interval values; and
   (a-3) when two or more of the inversion interval values are preset, presetting the variation pattern by inverting the output of the sound signal sequentially depending on the two or more of the inversion interval values on every occurrence of overflow exceeding the variation time;
(b) previously mapping multi-formatted content information, which includes audio data and video data, with the variation pattern in a content server;
(c) outputting a sound signal according to the preset variation pattern from the wired/wireless AP to the outside;
(d) detecting, by a smart terminal having a serial number, in real-time the sound signal output from the wired/wireless AP;
(e) by a location server, receiving the serial number and the detected sound signal from the smart terminal, and transmitting the serial number and the unique identification information corresponding to the sound signal to the content server; and
(f) by the content server, receiving the serial number and the unique identification information from the location server, and transmitting the multi-formatted content information corresponding to the unique identification information to the smart terminal to be output.

5. The sound signal-based local interactive service providing method of claim 4, wherein step (d) further comprises:
   (d-1) storing, by the smart terminal, time during which the sound signal output in real-time from the wired/wireless AP is detected as cumulative data; and
   (d-2) transmitting the stored cumulative data to the content server via the location server,
   step (f) further comprises,
   accumulating, by the content server, the cumulative data received via the location server as a time coin that may provide a benefit through manipulation of the smart terminal, and
   step (b) further comprises,
   previously mapping the time coin with the multi-formatted content information.

* * * * *